UNITED STATES PATENT OFFICE.

DEMETRIUS M. STEWARD, OF CHATTANOOGA, TENNESSEE.

PROCESS OF PRODUCING NEW REFRACTORY MATERIAL FOR THE MANUFACTURE OF INSULATORS AND OTHER USES.

No. 816,271.

Specification of Letters Patent.

Patented March 27, 1906.

Application filed May 25, 1905. Serial No. 262,262.

*To all whom it may concern:*

Be it known that I, DEMETRIUS M. STEWARD, of Chattanooga, county of Hamilton, State of Tennessee, have invented a Process for Producing a New Refractory Material for the Manufacture of Insulators and other Uses, of which the following is a specification.

My present invention relates to the production of a new refractory material which, possessing, among others, the qualities of high non-conductivity, perfect resistance to the effects of heat and cold, and resistance to moisture, is peculiarly adapted for use in the manufacture of insulators for electrical or other purposes. In my application for United States Letters Patent No. 145,081, filed February 23, 1903, I have described a material, hereinafter designated "my compound," which possesses, among others, the qualities enumerated.

My compound is a complex anhydrous bisilicate having for its constituents silica combined with such oxids as are essential to the combination. In the manufacture of my compound I ordinarily prefer to employ as the basic material—that is to say, the element which affords chiefly the silica of the combination—the hydrous magnesium silicate commonly known as "talc," "steatite," or "soapstone" and with the same a suitable proportion of water-glass, sodium silicate, or potassium silicate or double water-glass composed of sodium and potassium silicates or alkaline silicates richer in silica or mixed with silica or their equivalent. There is a group of silicates each of which has a close resemblance one to another and of which as found in nature steatite is a fairly representative example. For convenience, therefore, the term "steatite" as employed herein is used to designate conventionally all substances of the same general description and characteristic qualities, including pyrophyllite, although it is a hydrous silicate of aluminium. From a mixture of magnesium silicate or water-glass, as hereinafter specified, the product obtained by my process exhibits as constituents the presence of sodium and magnesium oxids, as well as of aluminium oxid. I regard the presence in the compound referred to of sodium and magnesium oxids as essential to the combination. The aluminium oxid in that compound I regard as an adventitious quantity, present therein by reason, perhaps, of impurity in the basic material of the mixture from which it is produced. If a silicate of aluminium were employed as the base, which is suggested as a possible variation in the practice of my process, the foregoing statement might not in that instance be applicable. The presence in the aforesaid product of that which is regarded as an adventitious quantity—that is to say, a substance that is wholly inert and chemically ineffective—suggests the practice which has been in some instances followed by me of introducing to commercial advantage into the manufacture other correspondingly inert substances—such, for example, as slate, which while it may not enter into or interfere with the chemical combination in any wise may be employed to give bulk to the mass of my compound at a proportionately insignificant increase of cost without injury to the product in respect to certain determinate uses. For many purposes such an addition would constitute an adulteration of the product and should of course be therein avoided; but for other purposes it may constitute no more than an economical expedient. In respect to the product, as well as to the process, such addition to the mass is of the nature of mere surplusage or make-weight in the product, and therefore comes clearly within the scope of my present invention.

The present application comprehends the art or process from which my compound or finished product is derived.

In the practice of my process I prefer to take of magnesium silicate or of aluminium silicate or the substantial equivalents of either or both in finely comminuted or pulverulent form one hundred (100) parts, by weight, and of water-glass, sodium silicate, or potassium silicate in fluid form twenty (20) parts, by weight. The proportions specified may be varied by increase of the proportionate quantity of water-glass, the effect thereof being to vary the composition of the product so as to obtain the degree of hardness and density or compactness sought; but for general purposes I find it desirable and prefer, as specified, to use substantially the proportions stated. The powdered and liquid ingredients are then thoroughly mixed in any suitable manner by machinery or otherwise to a fictile, plastic, or "semiplastic" mass, if the last term be deemed more accurate, of about the consistency of workable putty. The pulverulent form of steatite is regarded as that form of it most favorable to the perfect commingling of the components of the mixture; but if any other form might be found to serve that purpose equally well it would come within the purview of my preference. The aforesaid commingled mass of materials is distinctively designated herein "the mixture." In some of the claims and elsewhere herein, in view of the suggested possibility of substitution of different components of the mixture for those specified as preferred and the variability of the relative proportions thereof and now and then for other obvious reasons, I discard the use of the definite article and employ the term "a mixture" to designate the commingled components. When the ingredients have been thoroughly commingled and reduced to desirable fictility—that is to say, to a condition suitable for molding or therwise fashioning it into shape—it is preferably subjected to great pressure, as in a hydraulic or other powerful press. The pressure may be applied to the fictile or plastic mass of the mixture either in the act of imparting to it the shape ultimately desired or in forming it into a blank preparatory to its being subsequently cut or otherwise dressed to conform to any preferred design. The application of pressure to the plastic or fictile mass of the mixture is calculated to impart to it that degree of homogeneity which is always desirable and which is in many instances essential in insulators and insulating or refractory material. In the manufacture of certain articles—such, for example, as those of hollow of tubular form—it is practicable by the employment of such presses provided with suitable nipples, as are familiar in the fictile art, to impart to the said articles at one and the same time and in one operation the desired shape and requisite degree of density. In other instances it is practicable only to compress the mass into a blank of the right density, reserving the final shaping of it to a later period in the manufacture, as hereinafter more particularly specified. After the mixture of components has been treated in the manner specified it is then dried, which may be accomplished by placing it in any suitable drying-kiln—for example, one heated by steam. As it comes from the drying-kiln the mixture is in that state which may be for convenience termed "green"—that is to say, it is of about the consistency of massive talc or native steatite and is in condition for dressing, rubbing, smoothing, drilling, tapping, mitering, grooving, or any other manual or mechanical operation necessary to or desirable for the completion or finishing of the article so far as shaping of it is considered. In other words, the mixture always remains throughout and after the drying step of the process in a formative and workable state, a quality which is lost in the compound, one of whose important characteristics is extreme hardness, a hardness which may be made such as to resist the action of any ordinary cutting-tool. That final step of the process by which the conversion to my compound of a mixture having steatite for its base is effected consists in subjecting for a requisite period of time the article formed from a mixture of suitable components, as specified, and in the green or kiln-dried state to a temperature at which the desired reaction and the conversion of the green mixture to the finished material—that is to say, to my compound—will take place. The temperature at which the change in the character of the green mixture to that of my compound occurs may be varied somewhat, variation in temperature being dependent upon various changes in conditions—such, for example, as in the components or proportions employed in the mixture. The reaction by which the mixture is converted to my compound begins to occur at about 700° centigrade and upward, and it appears to depend upon an elevated temperature rather than upon the length of time of exposure. Experience has shown the reaction to be complete and the best results to be obtainable under condition stated in the last sentence of this paragraph at about 1,500° centigrade. The time of exposure may be varied and is dependent in part upon the bulk of the mass that is being treated. In actual manufacture I employ a temperature of from 1,500° to 2,000° centigrade for a period determinable upon tests repeated at intervals during the firing, but usually of from five to eight hours. Laboratory tests upon comparatively minute articles have shown the best results to be obtainable by a five minutes' exposure to a temperature of about 1,500° centigrade.

It has been specified that the base—to wit, steatite or its equivalent—employed in the mixture for the manufacture of my compound is used in pulverulent or like suitable form. An obvious advantage derived from such use has been specified to be the perfect and uniform commingling of the components of the mixture; but there is another distinct advantage in the art that is not obvious. It is this: that by the use of steatite in powdered or like form not only is all raw material rendered equally serviceable in the art, (a circumstance of important consideration in view of the comparatively limited supply of native or raw steatite,) but also the utility of the substance in the arts is extended. The availability of steatite in a fictile state not only renders the use of it possible in the manufacture of articles at reduced cost as compared with manufactures thereof from massive steatite, but also in very many instances it renders possible the manufacture of articles which could not in any wise be produced from massive steatite by any of the known methods of working it. By way of example, particular reference may be made to the manufacture of hollow or tubular forms of any desired longitudinal dimensions, which is now being carried on by means of my process. By the aid of my process minute tubes, such as it appears cannot be made without it and which are of extensive utility in different arts, may be produced practically without limitation as to length.

It has been specified that my compound is a complex anhydrous bisilicate, and as indicating the lines of substitution in the practice of my process, previously referred to, of different components of the mixture for those specified the following suggestions are deemed to be important. It appears that my compound is a silicate in which the oxygen ratio of basic oxids to silica is as one to two and that it is therefore a complex bisilicate, as specified. In any given complex, considered with reference to its basic radicals, it is theoretically acceptable that any other radical having equal valence may replace each of the radicals present. For instance, potassium, lithium, and other members of a group will replace sodium; barium, strontium, and other members of another group will replace magnesium and calcium; chromium, manganese, and like elements will replace aluminium and iron. Even the potassium may replace the aluminium; but it would take three atoms of potassium to replace one atom of aluminium. Another variation suggests itself as a possible alternative. In addition to the hydrous magnesium and aluminium silicates mentioned (of which talc, pyrophyllite, and other bisilicates are examples) we have in nature a class of unisilicates. To this class belongs serpentine, which is a hydrous silicate of magnesium containing a larger percentage of magnesium than talc does and therefore less percentage of silica.

Considering the various steps of my process and the product obtained from a scientific point of view, the suggestion readily occurs that by supplying the deficiency of silica in one of the components of the mixture by excess thereof in another any of the unisilicates may be employed in my process. For instance, in combination with serpentine it might be feasible to use in preparing a suitable mixture for carrying out my process a glass richer in silica than ordinary waterglass, or the result might be reached by making the mixture of the basic material waterglass and silica.

While in the foregoing specification I have indicated by way of suggestion certain possible variations in my process, yet I wish it to be distinctly understood that in the preparation of the mixture used in the practice of my process I regard magnesium silicate and sodium silicate as the unquestionably-available components of the mixture. Whatever is predicated of the mixture of those components—to wit, of steatite and water-glass and of the compound derived therefrom—is founded upon actual experience in extensive and long-continued use of the same in manufacture of my product for commercial purposes. Said mixture constitutes, therefore, the standard with which proposed substitutes must be compared in order to determine their equivalency or non-equivalency for employment in my process. The suggestions of equivalents and variations, while they are founded partly upon general knowledge in the art and partly upon experimental use, are offered, for the most part, as hypotheses the truth of which may be verified in practice.

Articles made of my compound as heretofore described may, if preferred, for the sake of ornamentation or other reasons be by the use of any suitable enamel, such as that used on porcelain or kaolin ware, provided with a surface glaze.

What I claim is—

1. The process which consists in the conversion of a mixture of hydrous silicates in convertible proportions into a complex anhydrous bisilicate through the application of heat.

2. The process which consists in the conversion of a mixture of magnesium silicate and sodium silicate or their equivalent into a complex anhydrous bisilicate by the application of heat.

3. The process which consists in the conversion of a mixture of steatite and waterglass or their substantial equivalents in convertible proportions, by the application of heat, substantially as specified.

4. The process which consists in subjecting, for a requisite period of time, a mixture of suitably-constituted material having steatite for its base to a temperature at which the desired reaction and the conversion of the mixture to my compound will take place.

5. The process which consists in producing a complex anhydrous bisilicate by preparing a mixture of hydrous silicates and subjecting the same to a temperature at which the necessary reaction occurs, substantially as specified.

6. The process which consists of preparing a mixture of hydrous silicates in suitable proportions and in subjecting said mixture to a temperature at which the reaction necessary to its conversion occurs, substantially as and for the purpose specified.

7. The process which consists in preparing a mixture of magnesium and sodium silicates and in effecting reaction therein upon the application of heat at a temperature necessary to the conversion of the mixture.

8. The process of producing an insulating and refractory compound, the same being a complex anhydrous bisilicate having for its essential constituents silica with sodium and magnesium oxids, which consists in subjecting, for a requisite period of time, a mixture of suitable components, having steatite for its base, to a temperature at which the reaction necessary to the conversion of the mixture to the compound will take place.

In testimony whereof I have hereunto signed my name in the presence of two subscribing witnesses.

DEMETRIUS M. STEWARD.

Witnesses:
W. M. VICKERS,
W. H. DE WITT.